Patented Oct. 8, 1929

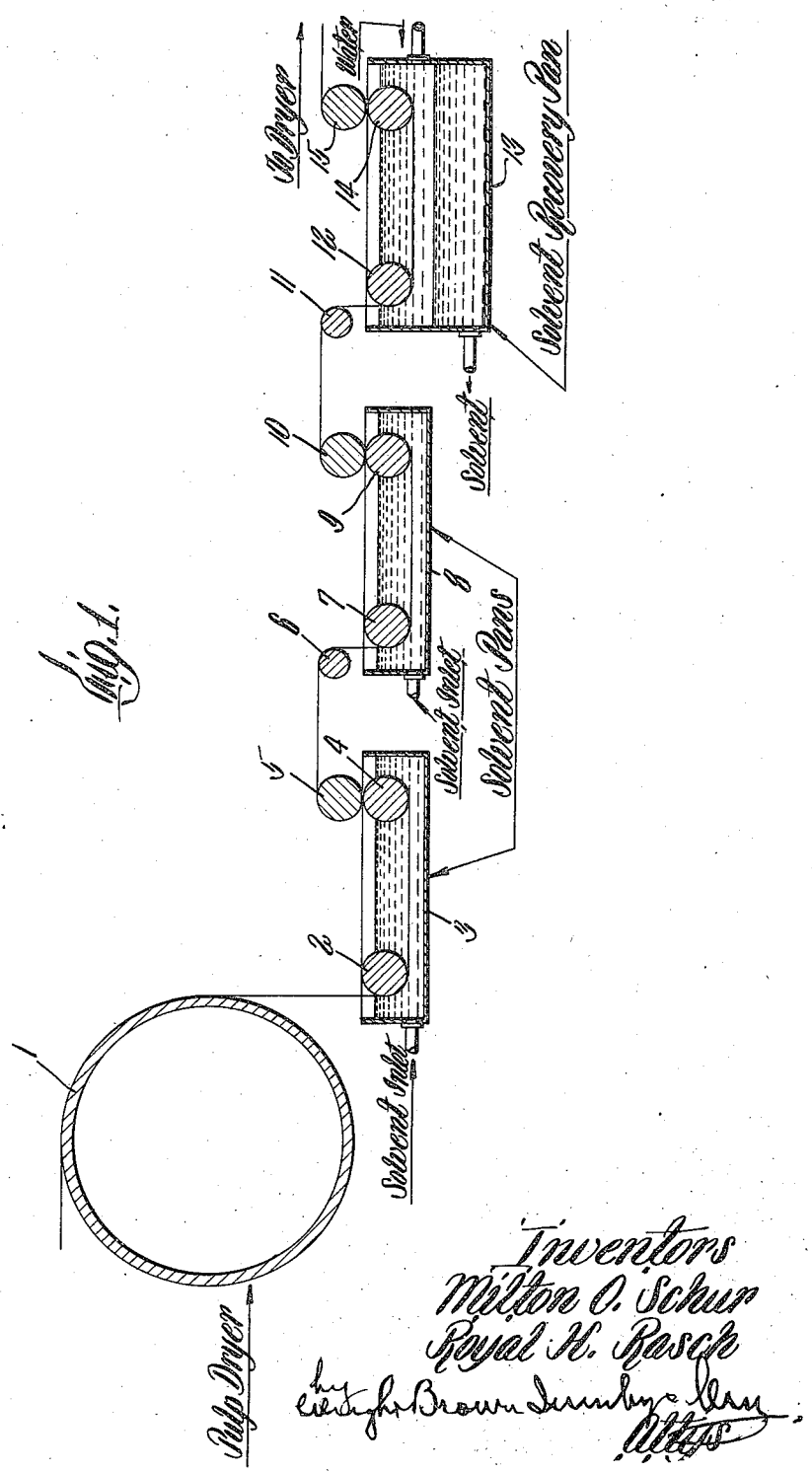

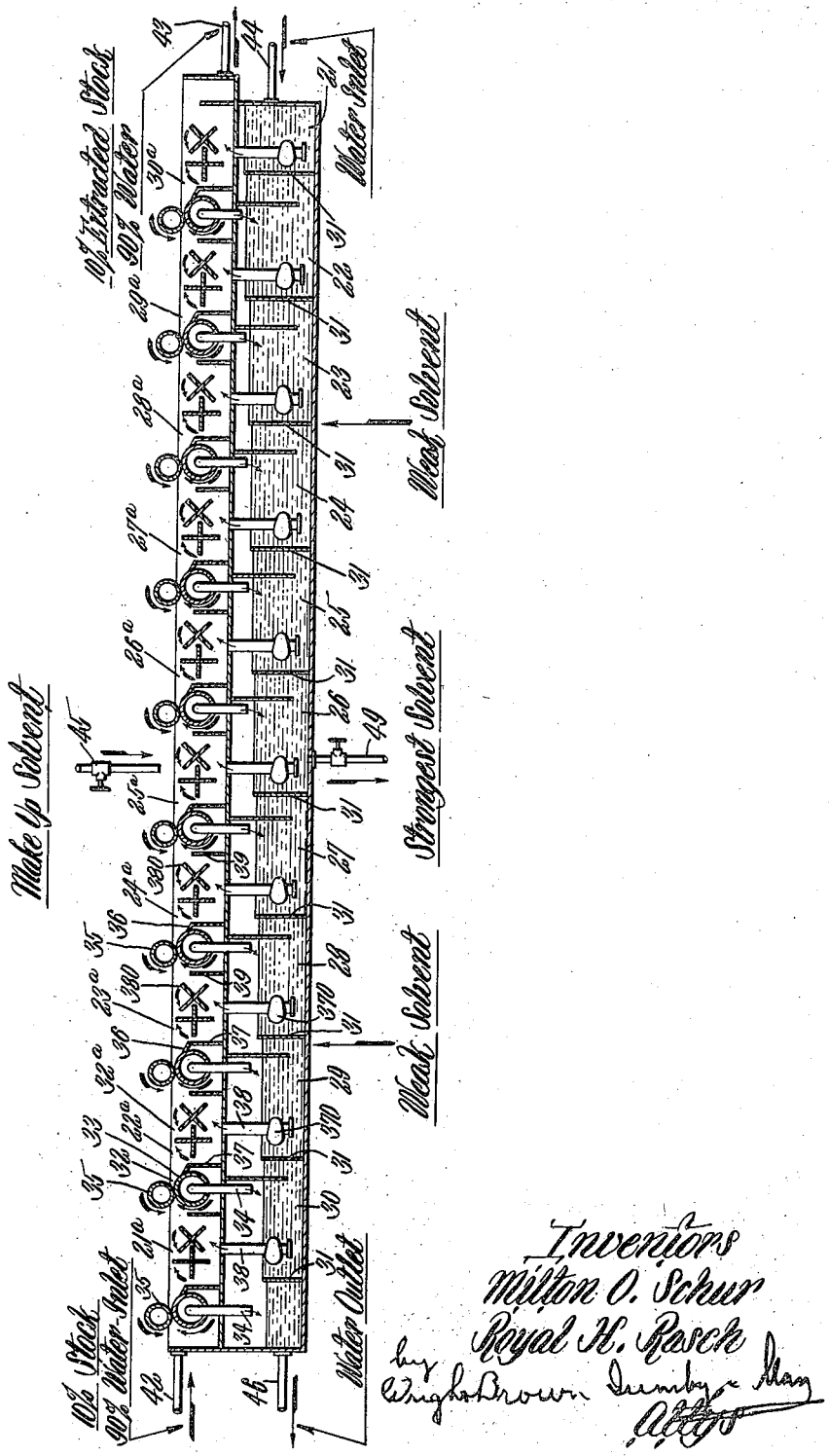

1,730,387

UNITED STATES PATENT OFFICE

MILTON O. SCHUR AND ROYAL H. RASCH, OF BERLIN, NEW HAMPSHIRE, ASSIGNORS TO BROWN COMPANY, OF BERLIN, NEW HAMPSHIRE, A CORPORATION OF MAINE

PROCESSING OF CELLULOSE FIBER

Application filed August 10, 1927. Serial No. 212,000.

This invention relates to a processing of cellulose fiber particularly intended to produce a product having a minimum amount of resinous impurities.

One major source of trouble with cellulose fiber used as a raw material for the production of high grade papers and derivatives lies in the resinous impurities which are likely to be present therein. Even though these resinous impurities are present in relatively small amount, they impair the color stability of paper prepared from the fiber and if the fiber is converted into derivatives the impurities are converted along with the cellulose into reaction products which not only impair the stability if the derivatives but also impart a certain amount of color thereto. The resinous matter is usually present to the extent of about 0.5% to 0.8% in bleached sulphite pulp, to the extent of about 0.2% to 0.4% in wood pulp refined to high alpha cellulose content, and to about the same extent in cotton. When these impurities are removed from the fiber, not only is its color stability greatly enhanced, but cellulose derivatives prepared from such fiber are improved to an important and surprising degree, both in stability and in freedom from color. The deresinified fiber is hence more suitable for use as a raw material for the manufacture of paper and for the production of rayon and other synthetic cellulose products, where purity of the raw material is of great moment.

In accordance with the present invention, the resinous impurities, including resins, gums, waxes, fats and oils, are removed from the fiber by extraction with organic solvents, such as alcohol, ether, chloroform, and the like. When thus extracted, the fiber becomes more stable toward heat and light, and yields derivatives of greatly enhanced quality. When wood fiber, in addition to being extracted, is refined to high alpha cellulose content, it yields derivatives as stable and as free from coloring matter as those prepared from high grade cotton. The process of the present invention, while applicable to cellulose fiber derived from various sources, is hence particularly advantageous in the case of wood fiber refined to high alpha cellulose content and intended to serve as a cotton fiber substitute in the production of high grade papers and cellulose derivatives.

A refined fiber may be produced by treating raw pulp, such as sulphite, with chlorine water, digesting the chlorine-treated pulp in an alkaline liquor, and bleaching the digested product. Treatment with chlorine effects a reaction upon ligneous matter in the pulp. Alkaline digestion effects a reaction upon and solution of chlorinated lignins, beta and gamma celluloses, resinous matter, and other non-alpha cellulose components in the pulp, so that the digested pulp is of high alpha cellulose content, requiring relatively little bleach to attain high whiteness. The resulting refined pulp, however, still contains residual resinous impurities which impair its quality. In accordance with the present invention, the pulp is subjected to extraction with an organic solvent at one or more stages of the refining process to remove these impurities. It is usually expedient to extract the bleached product, as it is generally run over a dryer and rid of substantially all of its water content, thus becoming better adapted for extraction. If the fiber is shipped in the form of thin paper prepared for nitration, the impurities may be extracted from such paper. Even the nitration grades of rag tissue may be extracted to advantage, as substantial improvement in the color of the resulting cellulose nitrate is realized.

If the fiber is handled in sheet form, it may be passed through one or more pans containing solvent, until freed of its resin content, and then passed over warming rolls to remove the solvent therefrom. If the solvent is immiscible with water, its recovery is readily effected by replacement with water, as cellulose fiber has much greater affinity for water than for water-immiscible solvents such as carbon tetrachloride or ether. It may, however, be more expedient to handle the fiber in the form of pulp or in the form of shredded paper, particularly when the solvent employed is water-miscible and it is desired to effect its recovery in economical fashion. Extraction may be effected while the fiber is being passed through and its water content first displaced with solvent and then with water in continuous countercurrent flow apparatus. Mixed solvents, or a succession of two or more different solvents, one capable of removing material insoluble in the other, may be advantageously employed.

On the accompanying drawings,

Figure 1 represents somewhat diagrammatically and conventionally apparatus intended for extracting fiber in the form of a sheet.

Figure 2 is a similar representation of apparatus intended to handle fiber in the form of a pulp suspension or shredded paper.

Referring to Figure 1 of the drawings, 1 represents a dryer roll over which cellulose fiber passes either in the form of a relatively thick sheet composed of unbeaten fiber or in the form of thin paper or tissue. The sheet coming from the dryer roll is passed under a roll 2, serving to guide the sheet into a bath of solvent maintained in a pan 3. The solvent employed, for example alcohol, is effective in extracting resinous impurities from the fiber and may be raised in temperature to increase the rate of extraction. The sheet is guided from the bath by a roll 4 partially submerged in the solvent and against which presses an upper roll 5 serving to remove excess solvent from the sheet as it passes from the bath. The sheet may then be extracted with another solvent, for example carbon tetrachloride, which is capable of extracting material which is unextractable by the first solvent. The sheet is shown passing over a roll 6 and under a roll 7, serving to direct the paper into a second bath of solvent in a pan 8, and thence between rolls 9 and 10, similar to the rolls 4 and 5. If the solvent employed in the pan 8 is immiscible with water, such for example as carbon tetrachloride, easy recovery thereof may be effected. As shown, the sheet, after emergence from between the rolls 9 and 10 is directed by rolls 11 and 12 into a water bath maintained in a pan 13. Inasmuch as cellulose fiber has much greater affinity for water than the carbon tetrachloride, the water displaces the carbon tetrachloride from the sheet and, as shown, settles to form a distinct layer on the bottom of the pan, so that the sheet contains mostly water when it passes out of the bath. The sheet passes from the pan 13 between rolls 14 and 15, and may then be passed over dryers (not shown), to remove the water carried thereby. The carbon tetrachloride may be drawn off from the bottom of the pan 13 and re-employed in the solvent pan 8.

If solvents miscible with water are employed to extract the resinous impurities, it may be more expedient to handle the fiber in the form of a pulp or shredded paper suspension, in order to provide an economical method of displacing and recovering the solvent. Extraction of the pulp may be effected in apparatus of the general type shown and described in United States Letters Patent No. 1,421,664, issued July 4, 1922, to Brown, Moore, Parker & Martinson. A series of extracting baths gradually increasing in solvent concentration from substantially only water at one end of the apparatus to maximum solvent concentration at an intermediate portion, and then gradually decreasing in solvent concentration from the intermediate portion to substantially only water at the other end, is maintained in the apparatus. Water is continuously fed into one end of the apparatus, and a flow of solvent is produced from bath to bath toward the other end from which water is discharged and into which pulp to be extracted is continuously fed in countercurrent flow to the water. A volume of solvent is continuously withdrawn from the apparatus at the desired point to prevent the concentration of coloring impurities in the solvent, and sufficient fresh solvent to make up losses and to replace solvent being withdrawn is continuously introduced into the intermediate portion of the apparatus.

As shown in Figure 2, the apparatus comprises a series of sections, each consisting of a storage tank containing a pool of solvent and an extracting tank associated therewith and located thereabove. The solvent in the successive storage tanks flows in a direction opposite to the flow of the fiber. These tanks are indicated at 21, 22, 23, 24, 25, 26, 27, 28, 29 and 30, in the direction of solvent flow. The solvent overflows a series of partitions 31 placed between the tanks and gradually decreasing in height from the tank 21 to the tank 30, so that substantially continuous flow of solution from the tank 21 to the tank 30 results. The extracting tanks are designated as $21^a$, $22^a$, $23^a$, $24^a$, $25^a$, $26^a$, $27^a$, $28^a$, $29^a$ and $30^a$, in the direction of the flow of fiber. Each treating tank is divided into two compartments. First, there is a thickening compartment 32, in which rotates a straining cylinder 33, on which fiber is deposited and through which the solvent passes and is returned by a pipe 34 to the corresponding storage tank. The fiber deposited on the straining cylinder is squeezed and thickened by a press roll 35 bearing against the cylinder. The fiber is removed from the cylinder ad deposited in an agitating compartment $32^a$ containing the solvent, by a scraper or doctor 36 acting against the cylinder and stationed on a partition 37 serving to divide the thickening and agitating compartments. A supply of solvent is maintained in each extraction tank by withdrawing solvent from the corresponding storage tank by a pump 370, and delivering it through a pipe 38 into the agitating compartment. The fiber is agitated in the solution maintained in the extracting compartment by a pair of agitators 380, and flows over a partition 39 into the next adjacent thickening compartment. There is thus a constant circulation of the solvent from each storage tank, through the agitating compartment of the extracting tank, and thence through the straining cylinder back to its storage tank. The pulp is introduced into the first extracting tank 21$^a$ through a pipe 42 and after extraction is withdrawn at the other end of the apparatus from the extracting tank 30$^a$ through a pipe 43. The solvent is introduced into the extracting tank 25$^a$ through a pipe 45, and water is introduced into the storage tank 21 through a pipe 44 and withdrawn from the storage tank 30 through a pipe 46.

The fiber may be delivered into the apparatus as, say, a 10% to 12% aqueous pulp suspension. As it passes through the successive extracting tanks toward the center of the apparatus, the water associated therewith is displaced by solvent of increasing strength, and acquires a maximum solvent concentration when it reaches the extracting tank 25$^a$, into which the solvent is introduced. On passing forwardly from the tank 25$^a$, the solvent associated with the fiber is displaced by solvent of progressively decreasing strength, and when the fiber is discharged from the last extracting tank 30$^a$, the solvent is substantially entirely displaced by water.

Operation may be initially commenced by maintaining the volume of solvent continuously delivered into the extracting tank 25$^a$, and the volume of water continuously introduced into the storage tank 21 substantially equal to the volume of water associated with the raw fiber. The apparatus is controlled to discharge a fiber having a water content equal to that of the raw fiber, substantially only water, therefore, being discharged through the outlet pipe 46. After the equilibrium concentration of solvent has been attained in the tanks, only sufficient solvent to make up for the solvent bled off from the storage tank 25 through a valved pipe 49 and to make up losses need be introduced into the extracting tank 25$^a$. The volume of water introduced into the storage tank 21 is then maintained substantially equal to the water content of the raw fiber as it is introduced, and the water discharged through the outlet pipe 46, so that the concentration of solvent in each of the storage and extracting tanks remains substantially constant during the continuous operation of the apparatus. The flow bled off through the pipe 49 is regulated to provide for the withdrawal of sufficient solvent to prevent accumulation of extracted matter in the apparatus. This bled-off solvent may be evaporated for the recovery of its valuable solvent content.

The process of extraction may be considered as comprising two steps, during both of which steps an extraction of material from the fiber by the solvent is effected. First, the gradual displacement of the water content of the fiber by solvent occurs, and then the gradual displacement of the solvent by water. Consequently, substantially all the solvent except that drawn off through the bleed pipe 49 is maintained within the apparatus, substantially only water accompanying the extracted fiber discharged through the pipe 43 at one end of the apparatus, and substantially only water being discharged through the outlet pipe 46 at the opposite end thereof. If the treatment is carried out at an elevated temperature, as by introducing low pressure steam into the central pool maintained in the storage tank 26, the heat content, except for that of the bleed solution and that lost due to evaporation of solvent, is maintained within the apparatus. The counter-current process thus described may be approximated in simpler apparatus through the use of tanks or centrifuges piped to allow the countercurrent displacement of water or of solvent in the stock.

Where an inert solvent is employed, it may be advantageous to add other chemicals to effect a removal of impurities other than resinous from the fiber. Thus, a certain amount of chlorine may be added to a solvent such as carbon tetrachloride to remove residual lignin. To a solvent such as alcohol, for example, a small quantity of caustic soda may be added to remove beta and gamma celluloses and other non-alpha cellulose components carried by the fiber. Alone or in addition to the caustic soda, soap may be added. Soap aids in the removal of resinous impurities, as it tends to disperse them and also has a detergent effect upon specks present in the fiber.

A process such as described makes possible the use of fiber quite high in resinous impurities, for such fiber may be deresinified to a point where it is quite suitable for the manufacture of high grade papers and derivatives. Our process, therefore, permits the use of highly resinous woods in the production of pulp, for resinous impurities surviving the fiber-liberating process or subsequent chemical treatments may be satisfactorily removed.

Having thus described certain embodiments of this invention, it should be evident to those skilled in the art that various changes and modifications might be made therein without departing from the spirit or scope of invention as defined by the appended claims.

We claim:—

1. A process which comprises treating cellulose fiber freed from encrusting material with organic solvents to effect a removal of resinous impurities contained therein.

2. A process which comprises treating cellulose fiber with a plurality of different organic solvents capable of extracting different resinous impurities contained therein.

3. A process which comprises treating cellulose fiber freed from encrusting material with an organic solvent capable of effecting a removal of resinous impurities and containing a chemical capable of reacting with and removing other non-alpha cellulose components in said fiber.

4. A process which comprises treating cellulose fiber with organic solvents to effect the extraction of resinous impurities carried therein, displacing the solvent with water, and recovering the displaced solvent for the treatment of other fiber.

5. A process which comprises passing a sheet of cellulose fiber through a water-immiscible solvent bath to effect the extraction of resinous impurities contained therein, passing the sheet through a water bath, thus displacing the solvent in said sheet by water and forming a layer of solvent in said water bath, and removing and recovering said solvent for use in said solvent bath.

6. A process which comprises treating cellulose fiber with a succession of different organic solvents, each capable of extracting different resinous impurities contained therein.

7. A process which comprises treating cellulose fiber with alcohol and then with carbon tetrachloride.

8. A process which comprises first passing a sheet of cellulose fiber through a water-miscible organic solvent and then through a water-immiscible organic solvent, passing the sheet through a water bath thus displacing the water-immiscible solvent in said sheet by water, and removing and recovering said displaced solvent.

9. A process which comprises first passing a sheet of cellulose fiber through alcohol and then through carbon tetrachloride.

10. A process which comprises first passing a sheet of cellulose fiber through alcohol and then through carbon tetrachloride, passing the sheet through a water bath thus displacing the carbon tetrachloride in said sheet by water and forming a layer of the same at the bottom of said bath, and removing and recovering the displaced carbon tetrachloride.

11. A process which comprises treating cellulose fiber with organic solvents to effect a removal of resinous impurities, and converting the cellulose thus purified into cellulose derivatives.

12. A process which comprises treating cellulose fiber with an organic solvent capable of effecting a removal of resinous impurities contained therein, and then displacing the solvent with water.

13. A process which comprises treating cellulose fiber with a water-immiscible solvent capable of effecting a removal of resinous impurities contained therein, and then treating the fiber in a water bath, thus displacing its solvent content with water and forming a layer of solvent in said bath.

14. A process which comprises treating cellulose fiber with a water-immiscible solvent capable of effecting a removal of resinous impurities contained therein, then treating the fiber in a water bath, thus displacing its solvent content with water and forming a layer of solvent in said bath; and removing and recovering said solvent.

In testimony whereof we have affixed our signatures.

MILTON O. SCHUR.
ROYAL H. RASCH.